H. J. CASE.
BUNDLE CARRIER.
APPLICATION FILED DEC. 29, 1913.
1,142,399.
Patented June 8, 1915.
2 SHEETS—SHEET 1.
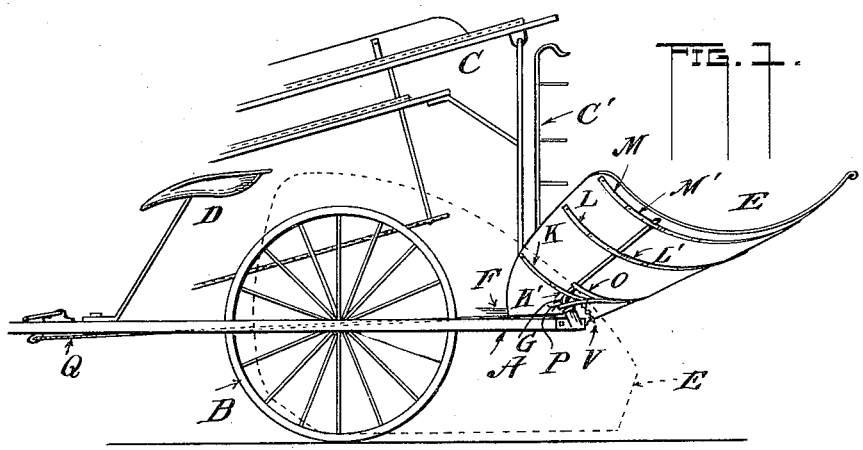
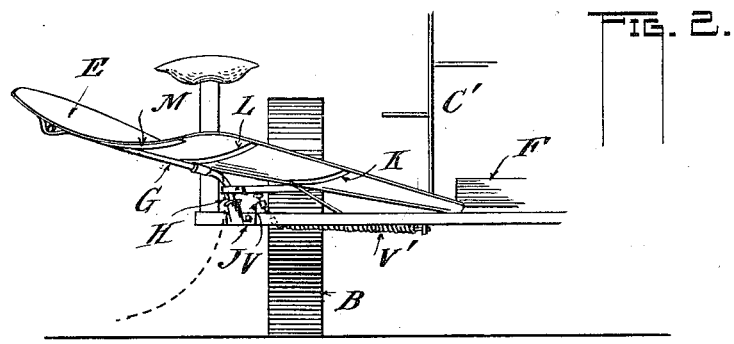
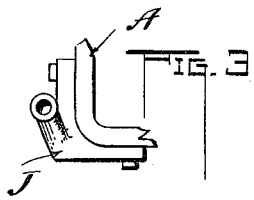
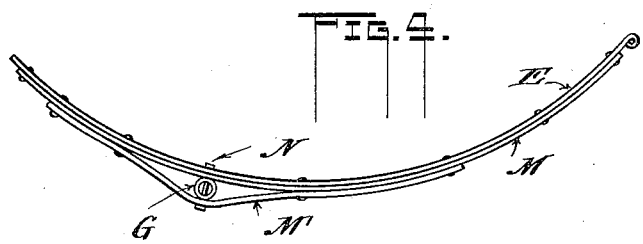
Witnesses:
Eunice Beckum
Marie Dacey
Inventor
Henry J. Case,
By L. M. Thurlow
Atty H. J. CASE.
BUNDLE CARRIER.
APPLICATION FILED DEC. 29, 1913.
1,142,399.
Patented June 8, 1915.
2 SHEETS—SHEET 2.
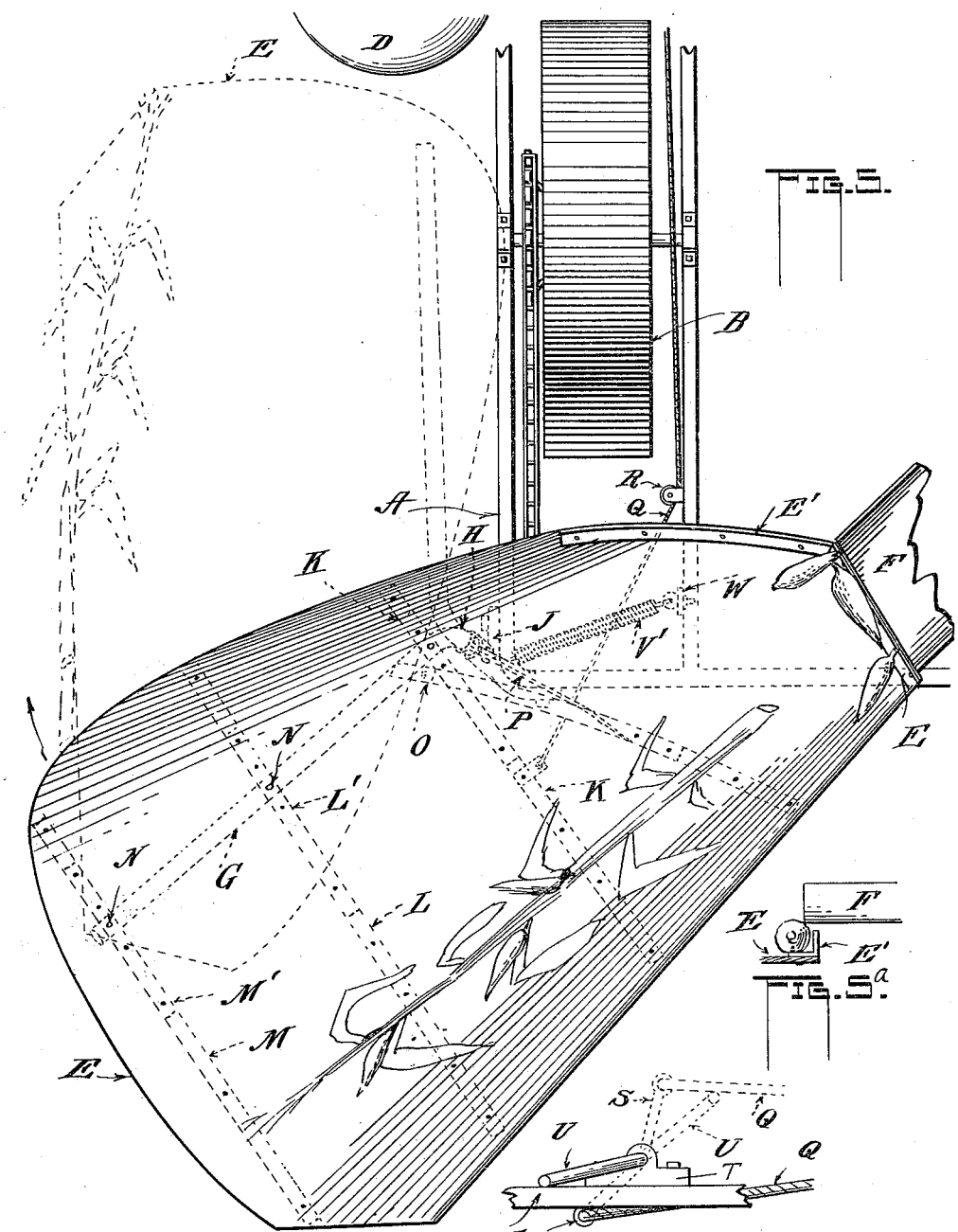
Witnesses:
Eunice Beckum
Marie Dacey
Inventor
Henry J. Case,
By L. M. Thurlow
Atty.

UNITED STATES PATENT OFFICE.

HENRY J. CASE, OF OWASCO, NEW YORK, ASSIGNOR TO ACME HARVESTING MACHINE CO., OF PEORIA, ILLINOIS, A CORPORATION OF ILLINOIS.

BUNDLE-CARRIER.

1,142,399.  Specification of Letters Patent.  Patented June 8, 1915.

Application filed December 29, 1913. Serial No. 809,328.

*To all whom it may concern:*

Be it known that I, HENRY J. CASE, citizen of the United States, residing at Owasco, in the county of Cayuga and State of New York, have invented certain new and useful Improvements in Bundle-Carriers; and I do hereby declare that the following is a full, clear, and exact description of the invention, which will enable others skilled in the art to which it appertains to make and use the same.

This invention relates to bundle carriers.

It relates more particularly to a bundle carrier peculiarly adapted for a corn harvesting machine.

One of the objects of the invention is to provide a bundle carrier for a corn harvester so mounted that it will swing from the rear of the harvester around to its side so that the bundles of corn will be deposited away from the machine and well beyond the path the horses will pass over in their succeeding round.

Another object is to mount a bundle carrier so that it will swing from the rear of the machine to the side and in doing so change its position from a practically horizontal position to substantially a vertical one.

Another object is to provide a bundle carrier of solid construction to retain detached ears of corn that may fall upon it. That is to say, the object is to construct a bundle carrier in the form of a pan of sheet metal, for example, to replace the ordinary bundle carrier made up of fingers and one that in retaining the bound bundles of corn will likewise hold the loose or detached ears so that the ears will be deposited with the bundles instead of being scattered throughout the field.

Another object is to provide a bundle carrier that, having discharged the bundles, can be immediately returned to its receiving position, its construction and operation being such that the bundles of corn are discharged well away from it so as not to be greatly in the way of its return movement.

Another object is to provide a peculiar construction in a bundle carrier of solid construction serving to firmly brace it so that it will retain its form, and so mount it that gravity will cause its operation, when released, to discharge the bundles.

In the accompanying drawing, Figure 1 is a side elevation of a part of a corn harvester with the bundle carrier mounted thereon shown in two different positions. Fig. 2 is a rear elevation of a portion of a corn harvester showing the bundle carrier in its receiving position. Fig. 3 is a plan of part of a binder frame and a socket member secured thereto. Fig. 4 is an end elevation of the bundle carrier. Fig. 5 is a plan of a portion of corn harvester and the bundle carrier much enlarged and shown in two different positions. Fig. 5ª is a longitudinal section of a portion of the bundle carrier and a discharge chute above it. Fig. 6 is a side elevation of lever mechanism, and Fig. 7 is an elevation of the same seen from the rear.

It is customary, usually to construct bundle carriers of a series of fingers the ends of which after the delivery of the bundles at the side of the machine catch in the bundles, often preventing return to the receiving position and the machine must move a sufficient distance ahead to allow the fingers to clear the bundles. In this forced delay in returning the carrier, the discharging mechanism which is in continuous operation often discharges one or more bundles directly behind the machine in the path the horses will take in their succeeding trip around the field all of which is undesirable. There are still other bundle carriers which include in their construction a hinged piece or gate at the discharge side, to retain the bundles, that must be lowered at the time of the discharge of the bundles and afterward restored to position before the carrier can be raised to its receiving position. But because of the presence of the bundles, as in the first instance, said gate cannot be raised until the machine has advanced clear of them.

My bundle carrier is so constructed that it will retain all of the bundles placed upon it without a separate raisable retaining part and it is so mounted that the bundles are thrown well outward away from it, its construction being such as to enable the operator to raise it even while the bundles lie against it after their discharge upon the ground. In addition to these advantages its solid construction insures the retention of the loose or detached ears which in an open form of carrier are usually found spread along the field in the wake of the machine.

In the drawing reference characters correspond to those of the following specification.

A indicates a portion of the main frame of a corn harvesting machine.

B indicates one of the road wheels.

C, Fig. 1, represents certain portions of the binding mechanism of the machine not necessary to describe, since they do not of themselves enter into the consideration of the present invention.

C′ is indicative of an upright binding and discharging mechanism, and D is the driver's seat.

The bundle carrier as a whole is represented by E. It consists preferably of sheet metal of substantially the form shown in the various figures. That is to say, it is preferably in the form of a segment of a cylinder narrowed at what may be termed its receiving end adapted to lie adjacent to and slightly below the chute F, part only of which is shown, bundles of bound corn being discharged from said chute upon the carrier together with any loose or detached ears that may fall from the stalks during the cutting and binding operation. The bundle carrier is considerably wider at its outer end, by preference, in order to increase its capacity while the cylindrical form provides a receptacle that will retain the bundles under the most adverse conditions. The narrow end of the carrier lies close to the chute so that any detached ears ejected from the latter will be pushed into the carrier and there retained rather than to be lost upon the ground.

G is an arm beneath the carrier for supporting it. At one end the arm is bent into an extension H, Fig. 2, and J is a casting secured to the machine frame and provided with a socket, Fig. 3, to receive the said end H.

As shown in the various figures, especially in full lines in Fig. 5, which is the receiving position of the carrier, this member G is stationed nearest the forward edge of the latter. As shown in Fig. 2 the extension H is bent at an obtuse angle to the main portion, the carrier being held in an inclined position or extending at an angle upwardly at its outer end by said arm, see Figs. 1 and 2.

The axis of the socket in the casting J is inclined both outwardly to one side away from the binder frame and forwardly in the direction of advance (see Figs. 1 and 3) and the extension H resting therein must be inclined in a like manner. By this arrangement the tendency of the carrier is to fall by gravity downward and outward to the side of the machine and forward or in the direction of advance for the discharging operation. The under side of the carrier is provided with a series of bracing members K L M which lie substantially parallel to one another and substantially at right angles to the longest measurement of the body. They are curved as shown in Fig. 4 to conform to the curve of the body. The supporting arm G lies upon the members as also shown in Fig. 4, and overlying the said arm are members K′ L′ M′, Fig. 1. Bolts N extend through the arm G, the body, and the members securing the whole structure in an absolutely rigid manner the overlying portions K′ L′ M′ being also secured by means of rivets passing through them and the body. This arrangement forms a truss that will hold the body in its curved position regardless of the weight imposed upon it. In addition to the members K L M there is a similar member O indicated in Fig. 5 secured in any suitable manner to the member G. This extends at an angle toward the narrow end of the body and is secured to it. In addition, there is a bracing member P secured in suitable manner to the extension H and said member P extends to, overlies, and is secured to said member O described. Secured to one of the members, for instance K, Fig. 5, is a cable Q. This extends over a pulley R and forward to a foot lever mechanism near the front of the frame A within reach of the driver's seat. As shown in Figs. 6 and 7, this may consist of an arm S to which the cable Q is attached. This arm is mounted in a suitable bearing T secured on the frame and U is a foot lever in control of the arm. The relation of the arms to one another is such that when the foot lever U is depressed it is limited in its downward movement by a suitable stop such as in striking a part of the frame, for example, see Figs. 1 and 6, the arm S lies in a position below the arm. The pull of the cable Q which supports the bundle carrier in the receiving position has no effect upon the foot lever, the latter forming a lock and in its position on the stop sustaining the carrier in its receiving position.

Secured to some part of the carrier as for instance the part P is one end of a short length of chain or other flexible member V. To the other end is attached a coiled spring V′ which is also attached to a part of the machine frame or to a part W thereon. In the receiving position of the bundle carrier the spring is idle, the said carrier being held in the position named through the foot lever mechanism just described. When, however, the foot lever is raised so that the arm S can move rearward the carrier due to gravity and the weight of the load swings in the direction of the dart, Fig. 5, taking up the position shown in broken lines in that figure and putting the spring under strain. The straight edge of the carrier which in the receiving position is its rearmost edge, Fig. 5, becomes the edge over which the bundles are discharged. In the discharging position last described (broken lines Fig. 5)

as seen from above, the bundle carrier has changed its apparent shape from that shown in full lines in the figure last referred to from the fact that the edge that was rearmost and at quite an elevation is now quite near the ground by comparison, the carrier having tipped at an extreme angle. In Fig. 1, dotted lines show the position corresponding to that in Fig. 5 and the form corresponds in outline to the full lines in said Fig. 5.

A point of considerable importance and one that has been touched upon previously herein is that the carrier may clear the bundles so as to be raised without delay after the act of discharging. This is possible because the discharge edge of the carrier is smooth throughout and does not present any points or projections that will catch in the bundles of corn as results in the common form of carrier employing a series of fingers and in which when the bundle becomes impaled upon them the points prevent the operator from returning the carrier to its receiving position. Any bundles lying against the carrier are readily pushed out of the way and the device is returned to position without delay and without the machine throwing off bundles in the rear.

In practice the bundles having been loaded are discharged by "kicking off" the foot lever whereupon the carrier instantly swings around to the side due to its weight and that of the bundles carried thereby placing the spring V' under tension which when the bundles are discharged serves to return the carrier to the first position, aided by the pressure placed upon the foot lever, returning the carrier immediately to its receiving position, the spring limiting the forward swing, if desired, or the carrier may be limited in this movement by striking the frame or some other part.

As has been stated, an open form of bundle carrier or one having fingers permits detached ears to fall through it as they pass from the machine with the result that they are strewn around the entire field in the wake of the machine. By using a carrier of solid construction this is not possible since the ears upon being discharged from the chute F are retained and discharged with the bundles. Across the said narrow end on the receiving side of the carrier is a stop E' for instance angle iron, Figs. 5 and 5ª, which prevents the ears from leaving the carrier which is of sufficient capacity to receive and hold all the ears that may be discharged from the chute.

I am not aware of a bundle carrier of my construction that swings to wide limits and discharges the load well out at the side of the machine out of reach of the horses, nor am I aware of a carrier that tilts from a substantially horizontal position, as its receiving position, to an almost upright one as the discharging position thereby distinguishing my device from others. Contrary to other carriers of which I am aware mine swings so far forward in the act of delivering as to lie substantially parallel to the direction of advance insuring the delivery of the bundles directly out at the side where required and so that they lie parallel to the line of advance in which position they are most out of the way. This is by reason of the peculiar mounting of the carrier through the relation of the bend of the supporting arm G and the inclination of the axis of the socket of the casting J which is inclined both in the direction of advance and sidewise away from the machine.

In effect, the long arm of the member G will roll or turn about its own axis as its short end turns in the socket. Now, as the carrier E lies on the uppermost surface of the said long arm when the latter is in the position shown in Figs. 1, 2 and 5, or the receiving position, it is clear that as said arm swings in an arc toward the position for delivery, and turns, the carrier must likewise be turned to the same extent so as to take up the position shown in broken lines in Fig. 2.

Because of the fact that the carrier is attached to the arm in such a position that the weight of the carrier and the load placed upon it is rearward of the arm and the axis of its short end it is clear that in the release of the carrier gravity will instantly perform the dumping act. Again, the fact that the carrier is mounted on the arm G in the relation described, in the dumping position its edge over which the load is discharged is brought close to the ground so that as the bundles are discharged they are in effect delivered far out as from a chute.

In other devices of which I am aware the carrier is arranged to swing relative to the support on which it is mounted, requiring various parts and connections for changing its position thereon for receiving the bundles or for the discharging operation. In addition, there is the ability of the operator to return the carrier to the receiving position behind the harvester regardless of the bundles that may lie in the way, as already stated.

In order that the carrier can swing far to the front and lie substantially parallel to the line of advance in the discharging position so that the bundles can be deposited to lie parallel to said line of advance, the casting J is positioned so that its socket is well out from the frame. By this arrangement the carrier is in no way limited in its movement but has a free swing clear of the frame or other parts.

It is not my purpose to be confined to the exact structures described since slight changes may be made therein.

I regard the method of strengthening and bracing the body of the carrier as important since material of light gage may be used in its construction while having great strength to resist weight and strains.

Having described my invention, I claim:—

1. In a corn-harvester including an upright binding mechanism, in combination, the harvester frame, a support mounted pivotally on the stubbleward side of the machine and having its axis of movement inclined at an angle, upward, stubbleward, and forward, and adapted to swing, a bundle carrier fixed relative to said support and adapted in its movement with said support to change from its receiving position at the rear of the harvester to an inclined substantially upright position for delivery at the side of the harvester, and controlling means for sustaining the bundle carrier in its normal receiving position and for releasing the same.

2. In a corn harvester including an upright binding mechanism, in combination, the harvester frame, a swinging support pivotally mounted on the stubbleward side of the harvester, and having its axis of movement inclined at an angle upward, stubbleward and forward, a bundle carrier fixed near one of its edges rigidly to said support, said carrier in its swinging movement describing a segment of the surface of a cone, and mechanism to maintain the carrier in its receiving position and to release the same for the discharging operation.

3. In a corn-harvester including an upright binding mechanism, in combination, the harvester frame, a support pivotally mounted on the stubbleward side of the harvester and having its axis of movement inclined at an angle upward, stubbleward and forward and including an arm adapted in its swinging movement to describe a segment of the surface of a cone, a bundle carrier mounted rigidly on the arm, and controlling means for sustaining the bundle carrier in its receiving position and for releasing the same.

4. In a corn-harvester including an upright binding mechanism, in combination, the harvester frame, a bundle carrier having a pivoting portion beneath and rigid relative to said carrier, and pivotally supported on the stubbleward side of the said harvester frame, said portion depending from the carrier, its axis being inclined at an angle downward, rearward and inward toward the harvester, and controlling means to maintain the carrier in its receiving position and to release the same.

5. In a corn-harvester including binding mechanism, in combination, the harvester frame, a bundle carrier having a stem beneath and rigid relative to it, its axis extending downward at an angle toward the rear of and inward toward the harvester, the weight of the carrier in its receiving position lying rearward of the stem, and controlling means to move the carrier from its discharging position to and maintain it in its receiving position.

In testimony whereof I affix my signature in presence of two witnesses.

HENRY J. CASE.

Witnesses:
EUNICE M. BECKUM,
W. I. SLEMMONS.

Copies of this patent may be obtained for five cents each, by addressing the "Commissioner of Patents, Washington, D. C."